United States Patent [19]

Von Benda

[11] Patent Number: 5,573,871
[45] Date of Patent: Nov. 12, 1996

[54] ELECTROCHEMICAL CELL

[76] Inventor: Klaus Von Benda, Ulrich von Ensingen Str 3, D-72622 Nürtingen, Germany

[21] Appl. No.: 368,771

[22] Filed: Jan. 3, 1995

[30] Foreign Application Priority Data

Jan. 5, 1994 [ZA] South Africa .......................... 94/0054

[51] Int. Cl.⁶ .................................................. H01M 4/36
[52] U.S. Cl. ........................ 429/103; 429/113; 429/117; 429/245; 429/161; 429/211; 429/129; 429/130
[58] Field of Search ..................................... 429/103, 113, 429/117, 245, 161, 211, 129, 130

[56] References Cited

U.S. PATENT DOCUMENTS

| 5,143,802 | 9/1992 | Wright | 429/103 |
|---|---|---|---|
| 5,208,119 | 5/1993 | Ducan | 429/103 |
| 5,234,778 | 8/1993 | Wright | 429/245 |
| 5,279,908 | 1/1994 | Bones et al. | 429/102 |

FOREIGN PATENT DOCUMENTS

| 0001351A1 | 9/1978 | European Pat. Off. . |
|---|---|---|
| 0064234A | 4/1982 | European Pat. Off. . |
| 94/0054 | 1/1994 | South Africa . |
| 2246904 | 12/1992 | United Kingdom . |

*Primary Examiner*—Bruce F. Bell

[57] ABSTRACT

A high temperature rechargeable electrochemical cell which comprises a housing containing an anode separated from a cathode by a solid electrolyte separator. The separator is a hollow operatively upright electrode holder defined, in cross-section, by a plurality of peripherally spaced radially outwardly projecting lobes. The operatively lower end of the electrode holder is closed off and the electrode holder has at its operatively upper end a closure having an opening smaller than its cross-sectional dimension. A metallic current collector is disposed in said electrode holder. The current collector is inserted, in a first inoperative configuration, into the electrode holder through the closure opening, and thereafter extended into the lobes of the electrode holder, so that it assumes a second operative configuration in which it has a shape of larger cross-section than the opening.

25 Claims, 4 Drawing Sheets

ELECTROCHEMICAL CELL

This invention relates to an electrochemical cell. More particularly, the invention relates to a method of making a high temperature rechargeable electrochemical cell and precursor thereof, and to a current collector for such cell.

SUMMARY OF THE INVENTION

According to a first aspect of the invention, there is provided a method of making a precursor of a high temperature rechargeable electrochemical cell of the kind which comprises a housing containing an anode and a cathode, the housing having an interior divided by a solid electrolyte separator into an anode compartment and a cathode compartment, containing respectively the anode and the cathode, the anode comprising, when the cell is in its charged state and at its operating temperature, molten sodium, the separator comprising a conductor of sodium ions, and the cathode comprising, at said operating temperature and in said charged state, an electronically conductive porous electrolyte-permeable matrix having a porous interior impregnated with a sodium aluminium chloride molten salt electrolyte which is molten and in which the atomic ratio of Al cations:Na cations does not exceed 1:1, with the matrix containing, dispersed in its porous interior, active cathode material comprising at least one metal chloride selected from the group of nickel, iron, chromium, cobalt, manganese, copper and antimony chlorides, the housing being in the form of a metal canister, and the separator being a hollow operatively upright electrode holder defined, in cross-section, by a plurality of peripherally spaced radially outwardly projecting ribs or lobes, said cross-section being normal to the longitudinal axis of said housing, with the operatively lower end of the electrode holder being closed off and the electrode holder having at its operatively upper end a closure having an opening smaller than its cross-sectional dimension, with a metallic current collector being disposed in said electrode holder, the method including inserting the current collector, in a first inoperative configuration, into the electrode holder through the opening in its upper end closure, and thereafter extending at least part of the current collector, or allowing at least part of the current collector to extend, into at least one of the lobes of the electrode holder, so that it assumes a second operative configuration in which it has a shape of larger cross-section than the opening in the electrode holder upper end closure.

More particularly, the metal canister may have tetragonal symmetry, with the separator being cruciform or clover-leaf shaped in the cross-section so that it has four of the lobes spaced equidistantly apart peripherally. The longitudinal axis will thus be a fourfold tetragonal symmetry axis. The method may then include locating parts of the current collector in each of the lobes of the electrode holder on the current collector assuming its operative configuration, with these parts of the current collector being in the form of fins or strips protruding outwardly from a central member.

The fins or strips may be biased towards their extended configuration so that the insertion of the current collector into the electrode holder can be effected by folding the fins or strips into their inoperative configuration against a biasing force to permit them to pass through the opening in the electrode holder closure, whereafter the biasing force urges the fins or strips into their operative configuration.

The fins or strips may instead, or additionally, be urged into their operative configuration by mechanical displacement means, which may comprise locating expandable elements adjacent each of the fins or strips, actuating the elements thereby to cause them to expand and urge the fins into their operative configuration, deactivating the elements to cause them to contract, and removing the contracted elements from the electrode holder. The elements may be pneumatically inflatable, and the location thereof may be effected either simultaneously with inserting the current collector in the electrode holder, or after insertion of the current collector and while it is still in its inoperative configuration.

In another embodiment, the fins or strips, in their inoperative configuration, may extend in the axial direction, with the length of the fins being greater than the length of the holder and being laterally displaceable, so that, on insertion of the current collector into the holder closure opening, the fins or strips are displaced laterally into the lobes on the distal ends thereof engaging the other end of the holder.

The method may naturally include such steps as, prior to insertion of the current collector into the electrode holder, locating the electrode holder in the housing, and, after insertion of the current collector into the electrode holder, loading the matrix, either before or after impregnation thereof with the electrolyte, into the cathode compartment.

The invention extends to a precursor of a high temperature rechargeable electrochemical cell, when made by the method as hereinbefore described.

According to a second aspect of the invention, there is provided a method of making a high temperature rechargeable electrochemical cell, which comprises subjecting a precursor as hereinbefore described, to at least one charging and/or discharging cycle, thereby to form a high temperature rechargeable electrochemical cell.

The invention extends also to a high temperature rechargeable electrochemical cell when made by the method as hereinbefore described.

The housing of the cell may, if desired, be a tetragonal compartment of a larger collective housing comprising at least two tetragonal compartments having at least one common wall. The opening in the separator closure may be circular.

The cathode may be located inside the interior of the solid electrolyte separator electrode holder. The anode side surface of the separator may be lined with wicking means for wicking molten sodium over said surface. This wicking means may be in the form of a lining of metal mesh, gauze or felt, e.g. of stainless steel, in contact or closely spaced from the separator surface.

Depending on the exact shape of the separator, the size of the circular opening in the holder closure and other design factors, the fins or radial extensions may extend some distance into the lobes of the separator, and may even rest against the separator wall after full extension. Thus, in the inoperative or folded configuration as represented during passage through the opening, the fins may overlap each other.

According to a third aspect of the invention, there is provided a current collector for a high temperature rechargeable electrochemical cell, which current collector comprises an elongate metallic member and at least one metallic fin or strip protruding transversely from the member in a first inoperative configuration in which the current collector can be inserted through an opening in a closure at one end of a hollow electrode holder of a high temperature rechargeable electrochemical cell, the fin or strip being extensible from the first inoperative configuration to a second operative configuration in which the fin or strip protrudes a greater distance from the member when the current collector is seen end on.

Four of the fins or strips, spaced equidistantly apart circumferentially, may be provided, with the member thus constituting a central post and the current collector being x-shaped when seen end on with the fins or strips in their operative or extended configuration and with the fins or strips being biased to their operative configuration. Thus, the post will be located in the centre of cathode compartment, with the fins or strips representing the arms of the x.

According to a fourth aspect of the invention, there is provided a current collector for a high temperature rechargeable electrochemical cell, which current collector comprises a pair of metal sheets, each sheet shaped to define a pair of fins protruding respectively from opposite sides of a central zone, with the sheets being joined along their central zones and the fins being extensible from a first inoperative configuration in which the current collector can be inserted through an opening in a closure at one end of a hollow electrode holder of a high temperature rechargeable cell, to a second operative configuration in which they protrude a greater distance from the central zones and wherein the current collector is x-shaped in cross-section when it is seen end on.

The central zones of the x may be reinforced, e.g. by welding additional metal strips, rods, wires and other profiles which may also, in use, extend into the space above the x-shaped section of the current collector for connection to a cell terminal. Instead, the reinforcing can be effected by backfolding said sheets to form layers in the central zones which layers may be joined to each other by spot-welding or other appropriate methods.

For various reasons, such a weight saving and to facilitate active mass filling and electrolyte flow, it may be useful to furnish said fins with openings, or to manufacture said fins from perforated sheet metal or expanded metal sheet.

The fins may have radial slits. The slits permit elastic sections to unfold immediately after passage through the opening or narrower parts of the separator.

An expandable element may be located removably adjacent each of the fins, with the elements being actuable to cause them to expand and urge the fins into their operative configuration, and deactuable to cause them to contract.

According to a fifth aspect of the invention, there is provided a current collector for a high temperature rechargeable electrochemical cell, which current collector comprises a metallic central post and a plurality of flexible metal bristles protruding from the post and being spaced circumferentially about the post.

The bristles may protrude substantially radially from the post, and may be in the form of intertwined strong wire.

According to a sixth aspect of the invention, there is provided a current collector for a high temperature rechargeable electrochemical cell, which current collector comprises an annular metallic member and at least one laterally displaceable primary metallic component protruding from the member in an axial direction.

Thus, the current collector has a tubular or basket shape without a central post, but has the central annular member or header ring.

The metallic component(s) may comprise metal strips, wires, mesh or netting, at least part of the component(s) being largely free to extend or be displaced sideways, in a lateral direction, into the lobes of the separator on insertion of the current collector into an electrode holder as hereinbefore described.

Thus, a plurality of primary metal strips, spaced circumferentially apart, may be provided. The current collector may then includes a plurality of metallic spacer strips protruding from the ring in the axial direction and located respectively between the primary metal strips, with the spacer strips being shorter than the primary strips.

The primary strips may, if desired, be arranged in opposed pairs, with the distal ends of each pair of strips being connected by a metallic bridging member so that the opposed pairs of primary strips are U-shaped when the current collector is seen side-on.

Naturally, it is within the scope of the invention to use positioning aids and means to align the current collector with the separator lobes before or after insertion therein.

BRIEF DESCRIPTION OF THE DRAWINGS

The invention will now be described, by way of example, with reference to the accompanying diagrammatic drawings, in which.

DETAILED DESCRIPTION OF PREFERRED EMBODIMENTS

Figure 1:
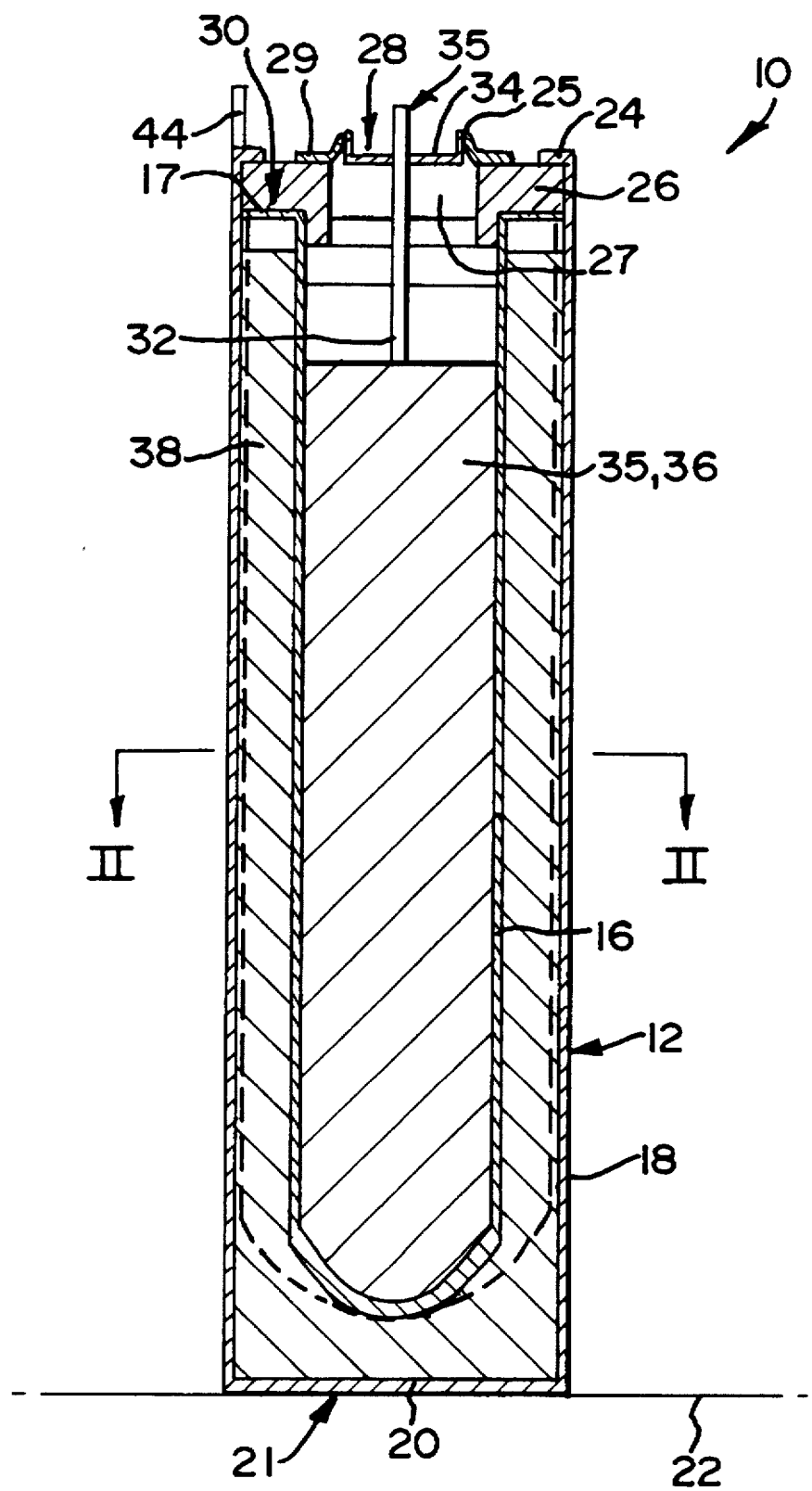
FIG. 1 shows a schematic sectional side-elevation of a cell according to the invention taken in the direction of line I—I in FIG. 2 and having a current collector according to a first embodiment of the invention.

In the drawings, similar components are indicated with the same reference numerals.

Figure 2:
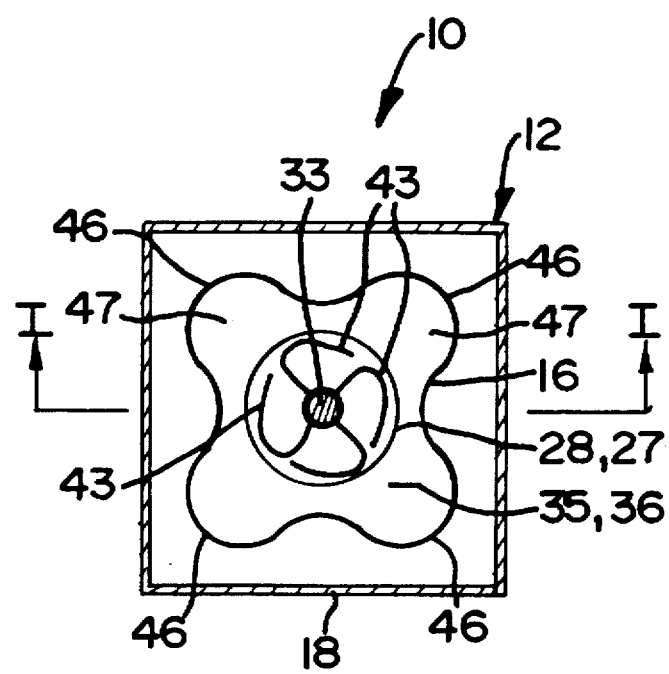
FIG. 2 shows a schematic horizontal cross-section or sectional plan view of the cell of FIG. 1, in the direction of line II—II in FIG. 1, prior to insertion of the cathodic active mass into the separator, and with the current collector in its inoperative or unextended configuration.

In FIGS. 1 and 2 of the drawings, reference numeral 10 generally designates a rechargeable high temperature electrochemical power storage cell in accordance with the present invention. The cell 10 comprises a mild steel housing in the form of a canister 12 which is elongated in a vertical direction and is substantially square in cross-section.

The cell 10 has a tubular β"-alumina separator 16 located centrally in the interior of the housing 12. The separator 16 has a closed lower end and an open upper end, and is described in more detail hereunder.

The canister 12 has side walls 18 and a lower end provided with a square floor panel 20 welded to the lower edges of the walls 18, which panel 20 provides, with the lower edges of the walls 18, a base 21 for supporting the cell in an upright condition on a flat horizontal upwardly facing support surface 22, as shown in FIG. 1. The closed lower end of the separator 16 is spaced from said floor panel 20. The upper end of the canister 12 is closed off by a square upper closure in the form of a mild steel closure panel 24, welded to the upper edges of the walls 18. The closure panel 24 has a central opening therein, sealed off by electronically insulating material in the form of an α-alumina insulating ring 26 of more or less square plan view outline, the ring 26 having a flat upper surface thermo-compression bonded to the lower surface of the panel 24, at the periphery of the central opening in the panel 24. The ring 26 has a central circular opening 27 therethrough, concentric with a central circular opening 28 in a nickel ring collar 29 thermo-compression bonded to said α-alumina insulating ring 26.

A nickel plated steel cathode terminal 35 nests in the collar opening 28 by means of a disc 34 forming part of said terminal. The disc 34 has a raised rim 25 concentric with and welded nestingly to a raised rim of said collar 29, and is also welded to a current collector 32 according to a first embodiment of the invention, and extending into the lower part of the separator, as described in more detail hereunder.

The open upper end of the separator 16 is glassed at 17 into a rebate 30 provided therefor in the lower surface of the ring 26.

The interior of the separator 16 contains a cathode 35 which comprises a porous nickel matrix 36 in intimate admixture with nickel chloride cathodic active mass and impregnated with $NaAlCl_4$ molten electrolyte, constituted from a substantially equimolar mixture of $NaCl$ and $AlCl_3$, said molten electrolyte filling the accessible pores of said cathode and extending into the space above said cathode. The current collector 32 is embedded in the matrix 36.

The housing 12, outside the separator 16, contains a sodium anode, which, like the sodium aluminium chloride electrolyte, is molten at the cell operating temperature. The outer surface of the separator is lined with a steel mesh gauze for wicking molten sodium 38 unto said surface, and the canister 12, which forms an anode current collector, is provided with an anode terminal 44.

The separator 16 is cruciform in cross-section, i.e. in plan view outline, as seen in FIG. 2. The separator 16 has four lobes 46 which are regularly circumferentially spaced 90° from each other and respectively aligned with the corners 14 of the canister 12. Each separator lobe 46 contains a lobe 47 of the matrix 36 of the cathode 35.

The current collector 32 comprises a central post 33 and four extensions or fins 43 of nickel-plated elastic or spring steel, shown folded inside the opening 28 during insertion into the cell, i.e. in their inoperative configuration. After complete insertion of the current collector through the openings 28 and 27, the fins 43 unfold to extend into the spaces defined by the lobes 46, to align essentially toward the apex of each lobe in an operative configuration. In other words, the fins 43 are biased towards their operative configuration and, to permit insertion into the separator 16, are folded against a biassing force; after insertion, the biassing force urges them into their operative configuration. This is followed by filling the cathodic space with the positive active mass and the melt electrolyte, and welding the current collector post 33 to the terminal disc 34, which in turn is welded to the collar 29 along its rim.

Figure 3:
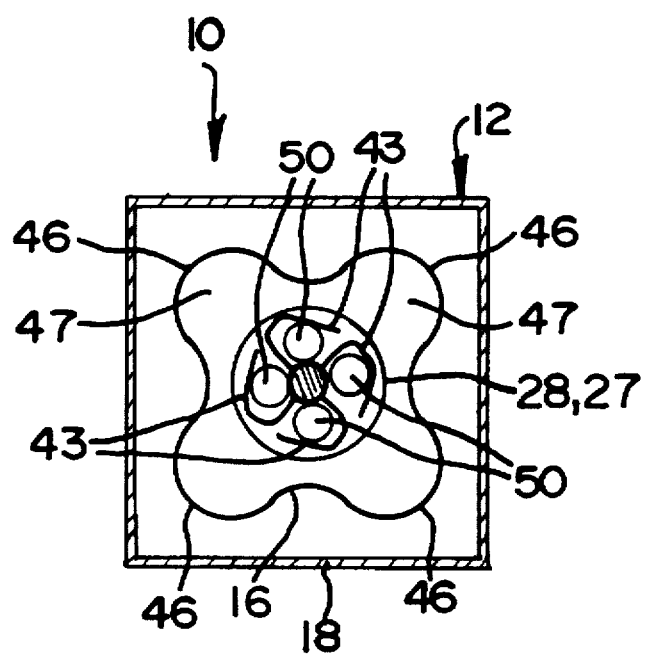
FIG. 3 shows a schematic horizontal cross-sectional plan view of a cell which is similar to that of FIG. 2, and hence has a current collector in an inoperative configuration, and which has mechanical displacement means adjacent the current collector.

FIG. 3 shows the same arrangement as FIG. 2 with added mechanical displacement means, in the form of expandable elements, for extending or unfolding the fins. The displacement means comprise four inflatable rubber tubes 50 extending parallel to the post 33 and inserted either together with the current collector or after positioning thereof. In the case of simultaneous insertion, the displacement means may be used as a holding and positioning tool for said current collector. Inflating the rubber tubes after pushing the folded current collector through openings 28,27 into position will urge the current collector fins 43 into the lobe spaces of the separator. Having located the fins in their respective lobe spaces, the rubber tubes will be deflated and retracted through the above openings.

Figure 4:
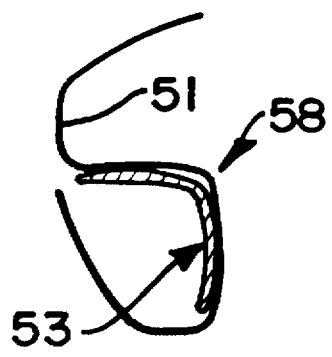
FIG. 4 shows a sectional plan view of a double fin of a current collector according to a second embodiment of the invention, in inoperative configuration.

FIG. 4 shows, in plan view outline, a current collector double fin 51 of a current collector according to a second embodiment of the invention. The double fin 51 comprises a single strip of nickel plated steel bent in opposing directions and forming an approximately 90° angle along an apex of curvature 58 bisecting said strip along its length, i.e. along a central zone and the fourfold symmetry axis of the cell and its separator. An angular reinforcing metal strip 53 of current collector material is welded alongside said approximately 90° section on its distal or outward facing side.

Figure 5:
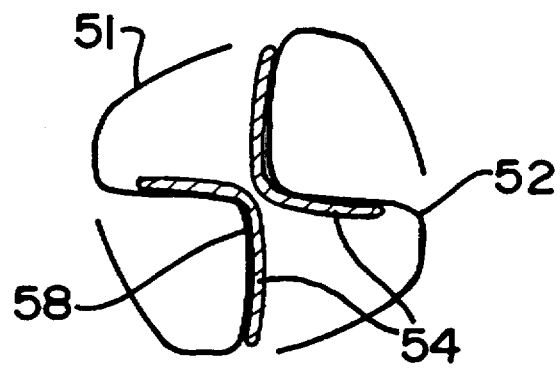
FIG. 5 shows a sectional plan view of a current collector according to a third embodiment of the invention, and comprising two double fins, in inoperative configuration.

FIG. 5 shows, in plan view outline, a current collector according to a third embodiment of the invention and composed of two double fins 51 and 52, having reinforcements 54 welded at the proximal or inner side of the current collector along the apex of curvature 58, i.e. at the central zones, to both double fins and to each other, to form a single unitary current collector with extensible fins. Thus, the current collector does not have a central post 33, but has a central post formed by welding the two angular reinforcements 54 together. The reinforcements 54 may instead be much narrower strips, merely cladding the bend or apex region 58, and they may extend to above the fins to form a current collector post welded to the terminal disc. Alternatively, an analogous design may be realized with the reinforcements 54 welded on the outward facing sides as shown in FIG. 4.

Figure 6:
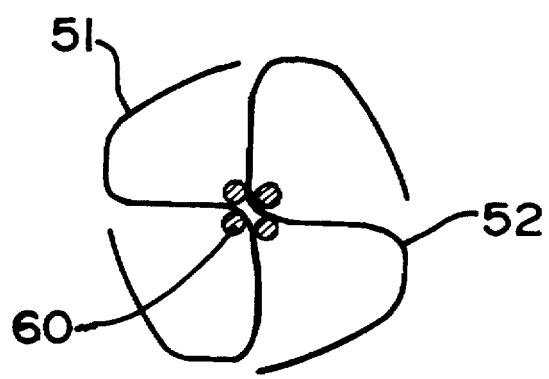
FIG. 6 shows a sectional plan view of a current collector according to a fourth embodiment of the invention, and comprising four rods in the centre, in inoperative configuration.

FIG. 6 shows, in plan view outline, a current collector according to a fourth embodiment of the invention, and composed of two double fins 51 and 52, joined together by welding four rods 60 to the fins to form a central post leading to the terminal.

Figure 7:
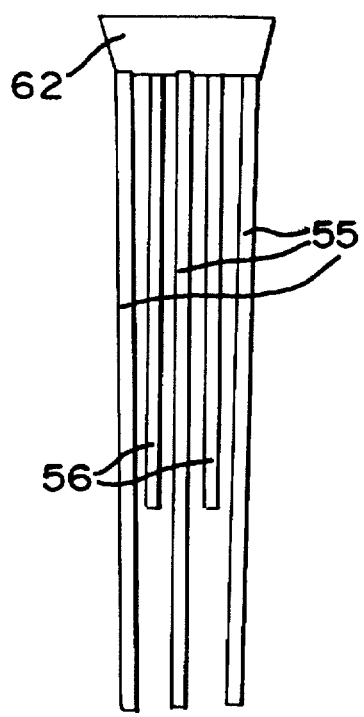
FIG. 7 shows, in side elevation, a current collector according to a fifth embodiment of the invention, and composed of a ring and appended metal strips.

FIG. 7 shows, in schematic side-elevation, a current collector according to a fifth embodiment of the invention, and having a conical header ring 62 with four long flexible primary fins 55, of which only three are shown, and four short spacer fins 56, of which two are shown, welded to said ring. The fins extend in axial direction. The fins are spaced apart circumferentially to form a basket which is insertable through the openings 28 and 27. The primary fins 55 extend laterally into the lobes of the separator after appropriate positioning of said basket by being displaced laterally into the lobes on their distal ends engaging the closed end of the separator.

Figure 8:
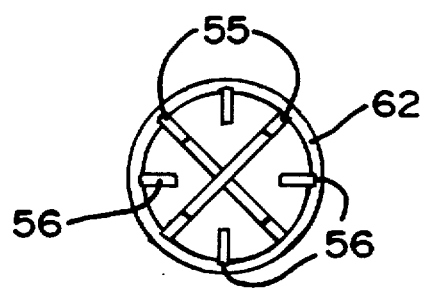
FIG. 8 shows, in plan view, a current collector according to a sixth embodiment of the invention, and composed of a ring and appended metal strips, in inoperative configuration.

FIG. 8 shows, in plan view from the top, and in inoperative configuration, a current collector according to a sixth embodiment of the invention. The current collector is composed of a conical header ring 62, two long primary strips 55 of elastic or flexible nickel plated steel welded crosswise at both ends to the header ring to form two U-bends, and four shorter spacer strips 56 welded to the ring at their upper ends. The long strips are urged to face the lobes and to distend into the lobes laterally when pushed into position with the lower end of the U-bends resting against the separator bottom.

Figure 9:
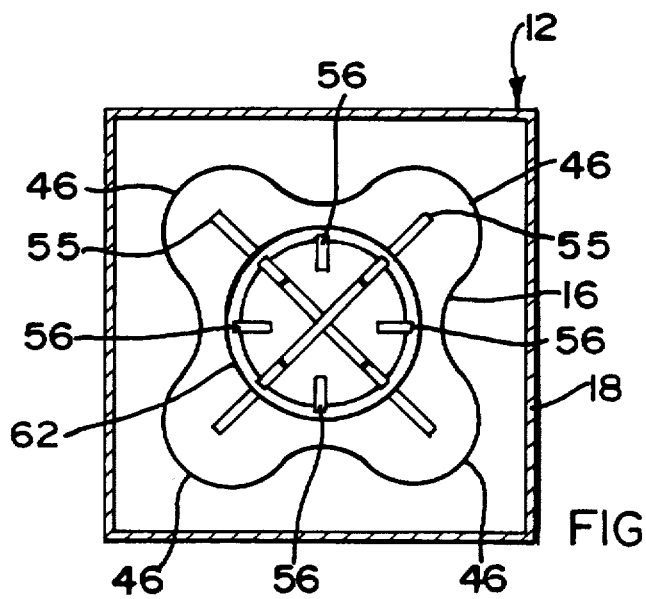
FIG. 9 shows, in plan view, the current collector of FIG. 8 in operative or extended configuration in a cell.

FIG. 9 shows the current collector of FIG. 8 in operative or extended condition with the long strips 55 extended sideways into the separator lobe spaces. The openings 28,27 are not shown. The header ring is then nested into the nickel ring collar 29 (not shown) so that the rims are flush, the materials for the cathodic spaces are introduced into the separator, and the terminal disc 34 is nested into the header ring and welded to both nickel ring collar 29 and to the header ring along its rim 25.

In all of the above examples, details of terminal construction have been omitted. It should be pointed out, however, that it is known in the art to provide the terminal with a filling tube for introduction of reactants and electrolyte, and to use that filling tube as a terminal post after closure. The present invention thus includes use of such a terminal for connection with the current collectors described above.

I claim:

1. A method of making a precursor of a high temperature rechargeable electrochemical cell of the kind which comprises a housing containing an anode and a cathode, the housing having an interior divided by a solid electrolyte separator into an anode compartment and a cathode compartment, containing respectively the anode and the cathode, the anode comprising, when the cell is in its charged state and at its operating temperature, molten sodium the separator comprising a conductor of sodium ions, and the cathode comprising, at said operating temperature and in said charged state, an electronically conductive porous electrolyte-permeable matrix having a porous interior impregnated with a sodium aluminium chloride molten salt electrolyte which is molten and in which the atomic ratio of Al cations:Na cations does not exceed 1:1, with the matrix containing, dispersed in its porous interior, active cathode material comprising at least one metal chloride selected from the group of nickel, iron, chromium, cobalt, manganese, copper and antimony chlorides the housing being in the form of a metal canister, and the separator being a hollow operatively upright electrode holder defined, in cross-section, by a plurality of peripherally spaced radially outwardly projecting ribs or lobes, said cross-section being normal to the longitudinal axis of said housing, with the operatively lower end a closure having an opening smaller than its cross-sectional dimension, with a metallic current collector being disposed in said electrode holder, the method comprising the steps of:

1) inserting the current collector, in a first inoperative configuration, into the electrode holder through the opening in the upper end closure of the electrode holder;

2) extending at least part of the current collector, or allowing at least part of the current collector to extend, into at least one of the lobes of the electrode holder, so that the current collector assumes a second operative configuration in which the current collector has a shape of larger cross-section than the opening in the electrode holder upper end closure; and 3) loading into the cathode compartment of the housing the electronically conductive porous electrolyte-permeable matrix, the sodium aluminium chloride molten salt electrolyte, and the active cathode material, dispersed in the matrix.

2. A method according to claim 1, wherein the metal canister has tetragonal symmetry, with the separator being cruciform or clover-leaf shaped in the cross-section so that the separator has four of the lobes spaces equidistantly apart peripherally, the method including locating parts of the current collector in each of the lobes of the electrode holder on the current collector assuming the operative configuration thereof, with these parts of the current collector being in the form of fins or strips protruding outwardly from a central member.

3. A method according to claim 2, wherein the fins or strips are biased towards their extended configuration so that the insertion of the current collector into the electrode holder is effected by folding the fins or strips into their inoperative configuration against a biasing force to permit them to pass through the opening in the electrode holder closure, whereafter the biasing force urges the fins or strips into their operative configuration.

4. A method according to claim 2, wherein the fins or strips are instead, or additionally, urged into their operative configuration by locating expandable elements adjacent each of the fins or strips, actuating the elements thereby to cause them to expand and urge the fins into their operative configuration, deactivating the elements to cause them to contract, and removing the contracted elements from the electrode holder.

5. A method according to claim 2, wherein the fins or strips, in their inoperative configuration, extend in the axial direction, with the length of the fins being greater than the length of the holder and being laterally displaceable, so that, on insertion of the current collector into the holder closure opening, the fins or strips are displaced laterally into the lobes on the distal ends thereof engaging the other end of the holder.

6. A precursor of a high temperature rechargeable electrochemical cell, when made by the method as claimed in claim 2.

7. A method of making a high temperature rechargeable electrochemical cell, which comprises subjecting a precursor as claimed in claim 6, to at least one charging and/or discharging cycle, thereby to form a high temperature rechargeable electrochemical cell.

8. A high temperature rechargeable electrochemical cell when made by the method as claimed in claim 7.

9. A current collector for a high temperature rechargeable electrochemical cell, which current collector comprises an elongate metallic member and at least one metallic fin or strip protruding transversely from the member in a first inoperative configuration in which the current collector can be inserted through an opening in a closure at one end of a hollow electrode holder of a high temperature rechargeable electrochemical cell, the fin or strip being extensible from the first inoperative configuration to a second operative configuration in which the fin or strip protrudes a greater distance from the member when the current collector is seen end on.

10. A current collector according to claim 9, wherein four of the fins or strips, spaced equidistantly apart circumferentially, are provided, with the member thus constituting a central post and the current collector being x-shaped when seen end on with the fins or strips in their operative configuration and with the fins or strips being biased to their operative configuration.

11. A current collector according to claim 10, wherein the fins have radial slits.

12. A current collector according to claim 10, which includes an expandable element located removably adjacent each of the fins, the elements being actuable to cause them to expand and urge the fins into their operative configuration, and deactuable to cause them to contract.

13. A current collector for a high temperature rechargeable electrochemical cell, which current collector comprises a pair of metal sheets, each sheet shaped to define a pair of fins protruding respectively from opposite sides of a central zone, with the sheets being joined along their central zones and the fins being extensible from a first inoperative configuration in which the current collector can be inserted through an opening in a closure at one end of a hollow electrode holder of a high temperature rechargeable cell, to a second operative configuration in which they protrude a greater distance from the central zones and wherein the current collector is x-shaped in cross-section when it is seen end on.

14. A current collector according to claim 13, wherein the fins have radial slits.

15. A current collector according to claim 13, which includes an expandable element located removably adjacent each of the fins, the elements being actuable to cause them to expand and urge the fins into their operative configuration, and deactuable to cause them to contract.

16. A current collector for a high temperature rechargeable electrochemical cell, which current collector comprises a metallic central post and a plurality of flexible metal bristles protruding from the post and being spaced circumferentially about the post.

17. A current collector for a high temperature rechargeable electrochemical cell, which current collector comprises an annular metallic member and at least one laterally displaceable primary metallic component protruding from the member in an axial direction.

18. A current collector according to claim 17, wherein a plurality of the metallic components, each in the form of a primary metal strip, and spaced circumferentially apart, are provided, and wherein the annular member is in the form of a header ring.

19. A current collector according to claim 18, which includes a plurality of metallic spacer strips protruding from the ring in the axial direction and located respectively between the primary metal strips, the spacer strips being shorter than the primary strips.

20. A current collector according to claim 18, wherein the primary strips are arranged in opposed pairs, with the distal ends of each pair of strips being connected by a metallic bridging member so that the opposed pairs of primary strips are U-shaped when the current collector is seen side-on.

21. A current collector for a high temperature rechargeable electrochemical cell, which current collector comprises an elongate metallic member; four metallic fins or strips protruding transversely from the member in a first inoperative configuration in which the current collector can be inserted through an opening in a closure at one end of a hollow electrode holder of a high temperature rechargeable electrochemical cell, the fins or strips being extensible from the first inoperative configuration to a second operative configuration in which the fins or strips protrude a greater distance from the member when the current collector is seen end-on, with the fins or strips also being spaced equidistantly apart circumferentially around the elongate metallic member so that the member constitutes a central post, and with the current collector being X-shaped when seen end-on with the fins or strips in their operative configuration; and an expandable element located removably adjacent each of the fins, with the elements being actuable to cause them to expand and urge the fins into its operative configuration and deactuable to cause them to contract.

22. A current collector for a high temperature rechargeable electrochemical cell, which current collector comprises a pair of metal sheets, each sheet shaped to define a pair of fins protruding respectively from opposite sides of a central zone, with the sheets being joined along their central zones and the fins being extensible from a first inoperative configuration in which the current collector can be inserted through an opening in a closure at one end of a hollow electrode holder of a high temperature rechargeable cell, to a second operative configuration in which they protrude a greater distance from the central zones and wherein the current collector is X-shaped in cross-section when it is seen end on, an expandable element located removably adjacent each of the fins, with the elements being actuable to cause them to expand and urge the fins into their operative configuration, and deactuable to cause them to contract.

23. A current collector for a high temperature rechargeable electrochemical cell, which current collector comprises an annular metallic member in the form of a header ring; a plurality of laterally displaceable primary metallic components protruding from the member in an axial direction, each primary metallic component being in the form of a primary metal strip, and the metal strips being spaced circumferentially part; and a plurality of metallic spacer strips protruding from the ring in the axial direction and located respectively between the primary metal strips, the spacer strips being shorter than the primary metal strips.

24. A current collector for a high temperature rechargeable electrochemical cell, which current collector comprises an annular metallic member in the form of a header ring; and a plurality of laterally displaceable primary metallic components protruding from the member in an axial direction, each primary metallic component being in the form of a primary metal strip, and the primary metal strip being spaced circumferentially apart, with the primary strips being arranged in opposed pairs, and the distal ends of each pair of strips being connected by a metallic bridging member so that the opposed pairs of primary strips are U-shaped when the current collector is seen side-on.

25. A method of locating a metallic current collector in an electrode holder of a precursor of a high temperature rechargeable electrochemical cell of the kind which comprises a housing containing an anode and a cathode, the housing having an interior divided by a solid electrolyte separator into an anode compartment and a cathode compartment, containing respectively the anode and the cathode, the anode comprising, when the cell is in its charged state and at its operating temperature, molten sodium, the separator comprising a conductor of sodium ions, and the cathode comprising, at said operating temperature and in said charged state, an electronically conductive porous electrolyte-permeable matrix having a porous interior impregnated with a sodium aluminium chloride molten salt electrolyte which is molten and in which the atomic ratio of Al cations:Na cations does not exceed 1:1, with the matrix containing, dispersed in its porous interior, active cathode material comprising at least one metal chloride selected from the group of nickel, iron, chromium, cobalt manganese, copper and antimony chlorides, the housing being in the form of a metal canister, and the separator providing the electrode holder which is hollow, operatively upright, and defined, in cross-section, by a plurality of peripherally spaced radially outwardly projecting ribs or lobes, said cross-section being normal to the longitudinal axis of said housing, with the operatively lower end of the electrode holder being closed off and the electrode holder having at its operatively upper end a closure having an opening smaller than its cross-sectional dimension, the method including inserting a metallic current collector, in a first inoperative configuration, into the electrode holder through the opening in the upper end closure of the electrode holder, and thereafter extending at least part of the current collector, or allowing at least part of the current collector to extend, into at least one of the lobes of the electrode holder, so that the current collector assumes a second operative configuration in which the current collector has a shape of larger cross-section than the opening in the electrode holder upper end closure.

* * * * *

UNITED STATES PATENT AND TRADEMARK OFFICE
CERTIFICATE OF CORRECTION

PATENT NO.    :   5,573,871

DATED         :   Nov. 12, 1996

INVENTOR(S)   :   Klaus Von Benda

It is certified that error appears in the above-identified patent and that said Letters Patent is hereby corrected as shown below:

On title page, insert item [73] to read

-- PROGRAMME 3 PATENT HOLDINGS --

Signed and Sealed this

Seventeenth Day of June, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.    :   5,573,871
DATED         :   November 12, 1996
INVENTOR(S)   :   Klaus Von Benda It is certified that error appears in the above-identified patent and that said Letters Patent is hereby corrected as shown below:

At column 1, line 23, change "A1" to --Al--.

At column 5, line 37, change "A1" to --Al-- and change "C1" to --Cl--.

At column 5, line 38, change "A1" to --Al-- and change "C1" to --Cl--.

At column 7, line 36, change "A1" to --Al--.

At column 10, line 54, change "A1" to --Al--.

Signed and Sealed this

Seventh Day of October, 1997

Attest:

BRUCE LEHMAN

*Attesting Officer*      *Commissioner of Patents and Trademarks*